(12) United States Patent
Xia et al.

(10) Patent No.: US 11,835,614 B2
(45) Date of Patent: Dec. 5, 2023

(54) GRAPHICAL NEAR-FIELD IDENTIFICATION METHOD FOR SIGNAL SOURCE

(71) Applicant: OPPLE LIGHTING CO., LTD., Shanghai (CN)

(72) Inventors: Jianming Xia, Shanghai (CN); Ting Chu, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 541 days.

(21) Appl. No.: 17/138,579

(22) Filed: Dec. 30, 2020

(65) Prior Publication Data

US 2021/0116530 A1 Apr. 22, 2021

Related U.S. Application Data

(63) Continuation of application No. PCT/CN2019/100053, filed on Aug. 9, 2019.

(30) Foreign Application Priority Data

Aug. 10, 2018 (CN) .......................... 201810910445.1

(51) Int. Cl.
*G01S 1/02* (2010.01)
*G01S 1/04* (2006.01)
(Continued)

(52) U.S. Cl.
CPC ............ *G01S 1/024* (2013.01); *G01S 1/0428* (2019.08); *G06F 16/9024* (2019.01); *H04B 17/318* (2015.01)

(58) Field of Classification Search
CPC ..... G01S 1/024; G01S 1/0428; H04B 17/318; G06F 16/9024

(Continued)

(56) References Cited

U.S. PATENT DOCUMENTS 9,879,980 B2   1/2018   Shen et al.
10,164,687 B2  12/2018  Jang
(Continued)

FOREIGN PATENT DOCUMENTS

CN      103424735 A    12/2013
CN      103688186 A    3/2014
(Continued)

OTHER PUBLICATIONS

International Search Report of PCT Application No. PCT/CN2019/100053 dated Oct. 31, 2019 with English translation, (6p).

*Primary Examiner* — Harry K Liu
(74) *Attorney, Agent, or Firm* — Arch & Lake LLP (57) ABSTRACT

A graphical near-field identification method and apparatus are provided. The method includes filtering a searched beacon signal according to a preset filtration condition. The method further includes matching a filtered beacon with beacons in all beacon graphs to obtain a beacon graph having a largest beacon matching number and the number of beacons matched with the beacon graph. The method further includes determining whether the number of the beacons matched with the beacon graph is less than a beacon determination minimum number requirement. The method further includes determining whether the number of the beacons matched with the beacon graph meets a beacon graph benchmark number condition. The method further includes determining that an object position is in a scenario where the beacon graph is located. The method further includes estimating a distance to the beacon by using a RSSI value of the beacon signal.

12 Claims, 5 Drawing Sheets

(51) Int. Cl.
*H04B 17/318* (2015.01)
*G06F 16/901* (2019.01)

(58) Field of Classification Search
USPC .......................................... 342/386
See application file for complete search history.

(56) References Cited

U.S. PATENT DOCUMENTS

| | | | |
|---|---|---|---|
| 2009/0322890 A1 | 12/2009 | Bocking et al. | |
| 2011/0306361 A1* | 12/2011 | Alizadeh-Shabdiz | H04W 4/02 455/456.1 |
| 2014/0087758 A1 | 3/2014 | Maor | |
| 2016/0261986 A1* | 9/2016 | Nord | G01S 1/024 |

FOREIGN PATENT DOCUMENTS

| | | | |
|---|---|---|---|
| CN | 103888900 A | 6/2014 | |
| CN | 106574959 A | 4/2017 | |
| CN | 104717611 A | 8/2017 | |
| CN | 107046711 A | 8/2017 | |
| CN | 108009452 A | 5/2018 | |
| CN | 108966137 A | 12/2018 | |
| WO | WO-2017098534 A1 * | 6/2017 | G01S 1/042 |

\* cited by examiner

GRAPHICAL NEAR-FIELD IDENTIFICATION METHOD FOR SIGNAL SOURCE

CROSS-REFERENCE TO RELATED APPLICATION

This application is a continuation of PCT patent application No. PCT/CN2019/100053 filed on Aug. 9, 2019, which claims priority to Chinese Patent Application No. 201810910445.1, filed on Aug. 10, 2018, the entire contents of all of which are hereby incorporated by reference herein for all purposes.

TECHNICAL FIELD

The present disclosure relates to the radio frequency field, and more particularly, to the field of near-field identification of radio frequency signals.

BACKGROUND

Beacon based on the radio frequency technology is a small information base station, which can be used in all of the activities related to mobility, such as indoor navigation, mobile payment, in-store shopping guide, pedestrian flow analysis, positioning tags, asset tracking and so on.

Beacon send information to mobile phones, which can help merchants optimize their business strategies and provide services by using users' geographical locations. Merchants can use beacon devices to inform consumers of new products and provide vouchers to encourage impulsive buying of consumers. The data obtained by beacon technology, such as geographical locations and purchase records, can also be used to provide more information on consumer satisfaction and to provide better services. The intelligent message pushing, product advertisement promotion and indoor positioning navigation have gradually become the trend. To realize these functions, beacon products are indispensable as basic hardware devices. At the same time, Internet giants such as ibeacon of Apple, Shake of WeChat and DingTalk of Ali are also promoting the development of beacon applications.

The main principle of the beacon is to transmit radio frequency in a specified channel, including data packets, which are obtained by the receiver and then analyzed and processed accordingly. However, the application of RSSI-based ranging may rely heavily on stable radio frequency signals. However, in practical applications, there are many factors such as site, deployment location, hardware devices, power supply and so on, which may cause instability, and the whole system will also be affected, thereby easily leading to poor accuracy of object identification.

SUMMARY

The present disclosure provides a graphical near-field identification method of a signal source.

According to a first aspect, the present disclosure provides a graphical near-field identification method of a signal source. The graphical near-field identification method may include filtering a searched beacon signal according to a preset filtration condition. The method may further include matching a filtered beacon with beacons in all beacon graphs to obtain a beacon graph having a largest beacon matching number and the number of beacons matched with the beacon graph. The method may also include determining whether the number of the beacons matched with the beacon graph is less than a beacon determination minimum number requirement, and abandoning all the filtered beacons in response to determining that the number of the beacons matched with the beacon graph is less than the beacon determination minimum number requirement. The method may further include determining whether the number of the beacons matched with the beacon graph meets a beacon graph benchmark number condition in response to determining that the number of the beacons matched with the beacon graph is not less than the beacon determination minimum number requirement. The method may also include determining that an object position is in a scenario where the beacon graph is located in response to determining that the number of beacons matched with the beacon graph meets the beacon graph benchmark number condition. The method may further include estimating a distance to the beacon by using a RSSI value of the beacon signal, determining the object position by multipoint algorithm, and reconstructing a basic graph formed of the signal source to quickly identify an object region, in the case where the number of beacons matched with the beacon graph does not meet the beacon graph benchmark number condition.

According to a second aspect, the present disclosure provides an apparatus for identifying a signal source is provided. The apparatus may include a filter, that may be configured to filter a beacon signal according to a preset filtration condition. The apparatus may further include a matching module, that may be configured to match a filtered beacon with beacons in all beacon graphs to obtain a beacon graph having a largest beacon matching number and the number of beacons matched with the beacon graph. The apparatus may also include and a determination module, that may be configured to determine whether the number of the beacons matched with the beacon graph is less than a beacon determination minimum number requirement. All the filtered beacons are abandoned and the current search is abandoned in response to determining that the number of the beacons matched with the beacon graph is lower than the minimum number requirement. The determination module may also be configured to determine whether the number of the beacons matched with the beacon graph meets a beacon graph benchmark number condition in the case where the number of the beacons matched with the beacon graph is not less than the minimum number requirement. In response to determining that the number of beacons matched with the beacon graph meets the beacon graph benchmark number condition, an object position is directly determined to be in a scenario where the beacon graph is located, and in response to determining that the number of beacons matched with the beacon graph does not meet the beacon graph benchmark number condition, a distance to the beacon is estimated by using a RSSI value of the beacon signal, the object position is determined by multipoint algorithm, so that a basic graph formed of the signal source to quickly identify an object region is reconstructed.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The present disclosure will be further described with reference to the accompanying drawings.

Embodiment 1

According to the present disclosure, radio frequency based on a beacon is used as a basic transmitting source, and dynamic configuration is carried out through adaptation of the physical terminal to environment, so that the application terminal can quickly identify. Such scenarios can be used for store product promotion, accurate advertisement push and the like.

Figure 1:
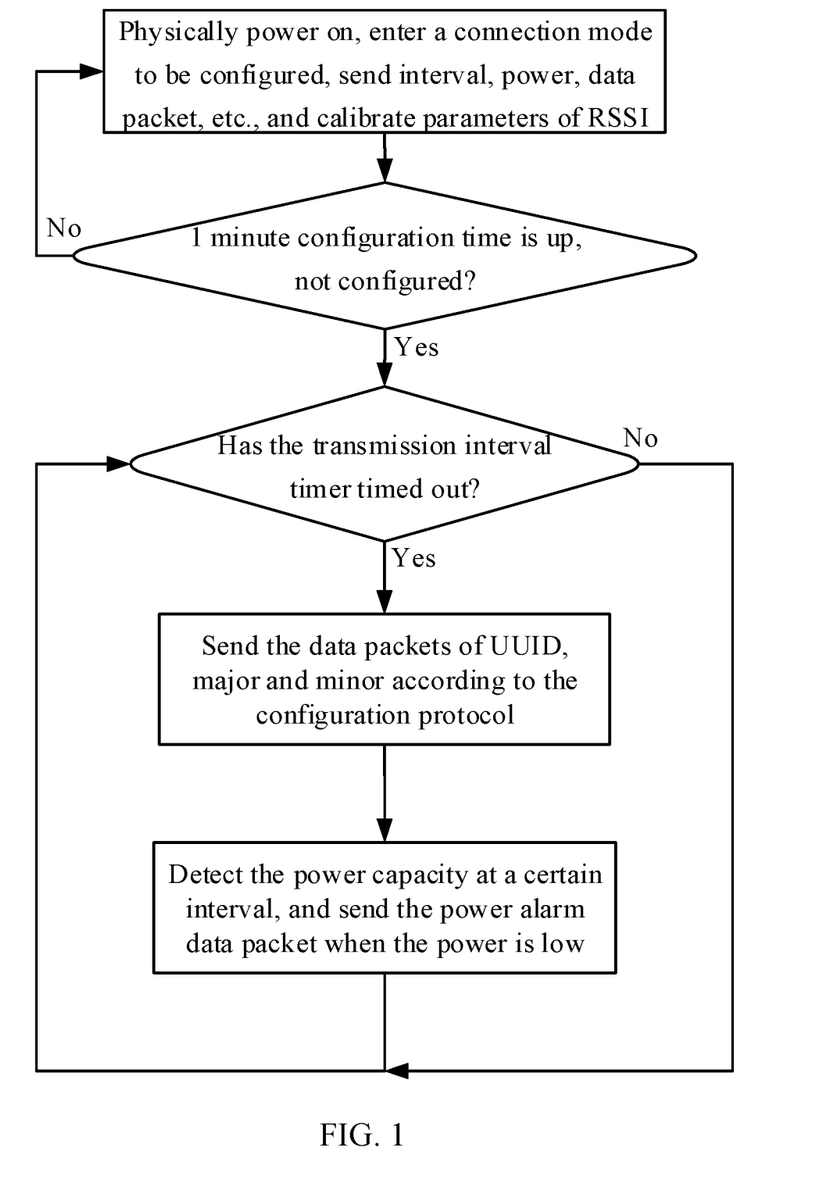
FIG. 1 is a schematic diagram of the operation principle of the beacon according to an embodiment of the present disclosure.

FIG. 1 is a schematic diagram of the operation principle of the beacon of the present disclosure.

(1) Within one minute of physical power-on, the configuration tool is allowed to connect and configure system parameters, such as the configuration of broadcast transmission interval, transmission power intensity, data packet content, RSSI calibration, etc., where the RSSI calibration is set according to the application scenario.

(2) After the configuration is completed or the default configuration time has passed, the data packet with a specified format, such as UUID or URL, etc., is normally transmitted according to the protocol, and a sleeping mode with low power consumption is entered after the transmission is completed.

(3) The beacon master controller reads the battery power through a digital-to-analog conversion port, and adds a data packet for sending power alarm at intervals when the power reaches an early-warning threshold. Until the user replaces the battery and the battery capacity is higher than the early-warning threshold, no warning package will be sent.

Embodiment 2

This embodiment relates to the graphical deployment of beacons. The deployment scenarios of beacons in the actual applications are different, which may be rectangular open office regions, irregular linear shopping malls, curved mines and so on. Therefore, the final form of the deployment may be a point, a straight line, a rectangle, a circle or an irregular graph, etc. The only common requirement is to eliminate the interference of various environmental blind sources and identify the correct information source accurately and quickly. The main steps of graph deployment are as follows:

(1) Assigning the number x of beacons and the serial numbers of the beacons in the region (for example, beacon point A: minor=49276, B: minor=49277, C: minor=49278, D: minor=49279, E: minor=49280);

(2) Setting a benchmark graph of the beacons in the region, wherein the beacons in the graph are in a same plane, the plane is parallel to the ground in the scenario, and the distance h between the plane of the beacon graph and the ground in the scenario is obtained by measurement (for example, defining 1: linear; 2: rectangular; 3: circular; 4: irregular graph);

(3) Setting the coordinate information of the beacons according to the positions of the beacons in the plane; {2, 49276 (a1, b1), 49277 (a2, b2), 49278 (a3, b3), 49279 (a4, b4)}

(4) Detecting and generating a graph benchmark table, and uploading the generated graph benchmark table to a background server.

FIGS. 2-5 are schematic diagrams of coordinates of the beacons in the linear, rectangular, circular and irregular graph deployments, respectively.

Figure 2:
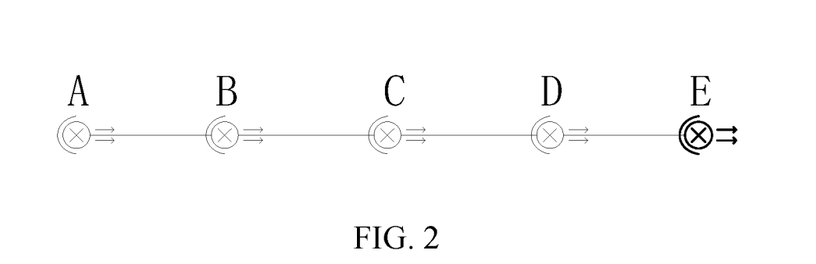
FIG. 2 shows an example of a linear deployment of beacons according to an embodiment of the present disclosure.

As shown in FIG. 2, the signal source graph coordinate table formed in the linear deployment of the beacons is: {{0, 0}, {0, AB}, {0, AC}, {0, AD}, {0, AE} }.

Figure 3:
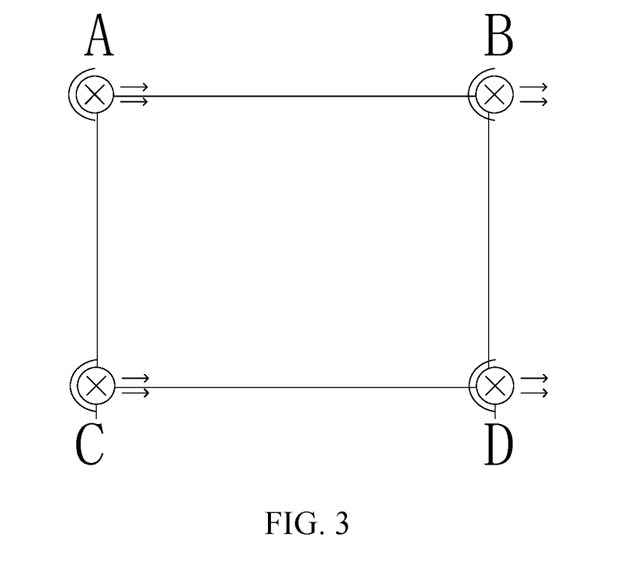
FIG. 3 shows an example of a rectangular deployment of beacons according to an embodiment of the present disclosure.

As shown in FIG. 3, the signal source graph coordinate table formed in the rectangular deployment of the beacons is: {{0,0}, {0, CA}, {CD, 0}, {CA, CD}}.

Figure 4:
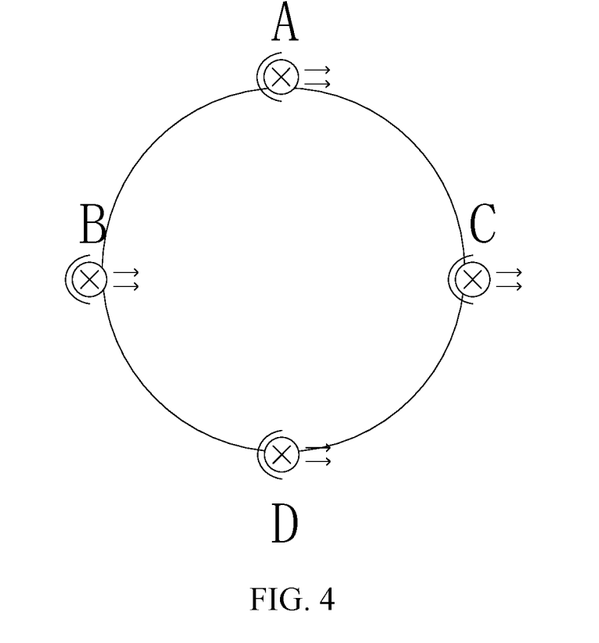
FIG. 4 shows an example of a circular deployment of beacons according to an embodiment of the present disclosure.

As shown in FIG. 4, the signal source graph coordinate table formed in the circular deployment of the beacon is: {{BC/2,0}, {0, BC/2}, {BC/2, BC}, {BC, BC/2} }.

Figure 5:
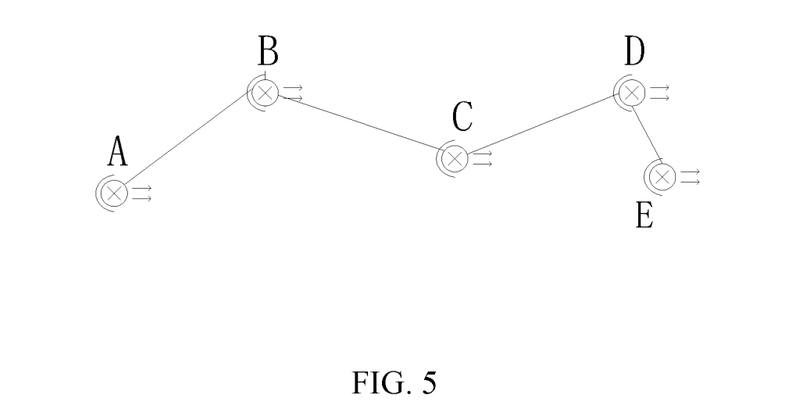
FIG. 5 shows an example of an irregular graph deployment of beacons according to an embodiment of the present disclosure.

As shown in FIG. 5, the signal source graph coordinate table formed in the irregular graph deployment of the beacons is: {{0,0}, {Xb, Yb}, {Xc, Yc}, {Xd, Yd}, {Xe, Ye}}.

Embodiment 3

Figure 6:
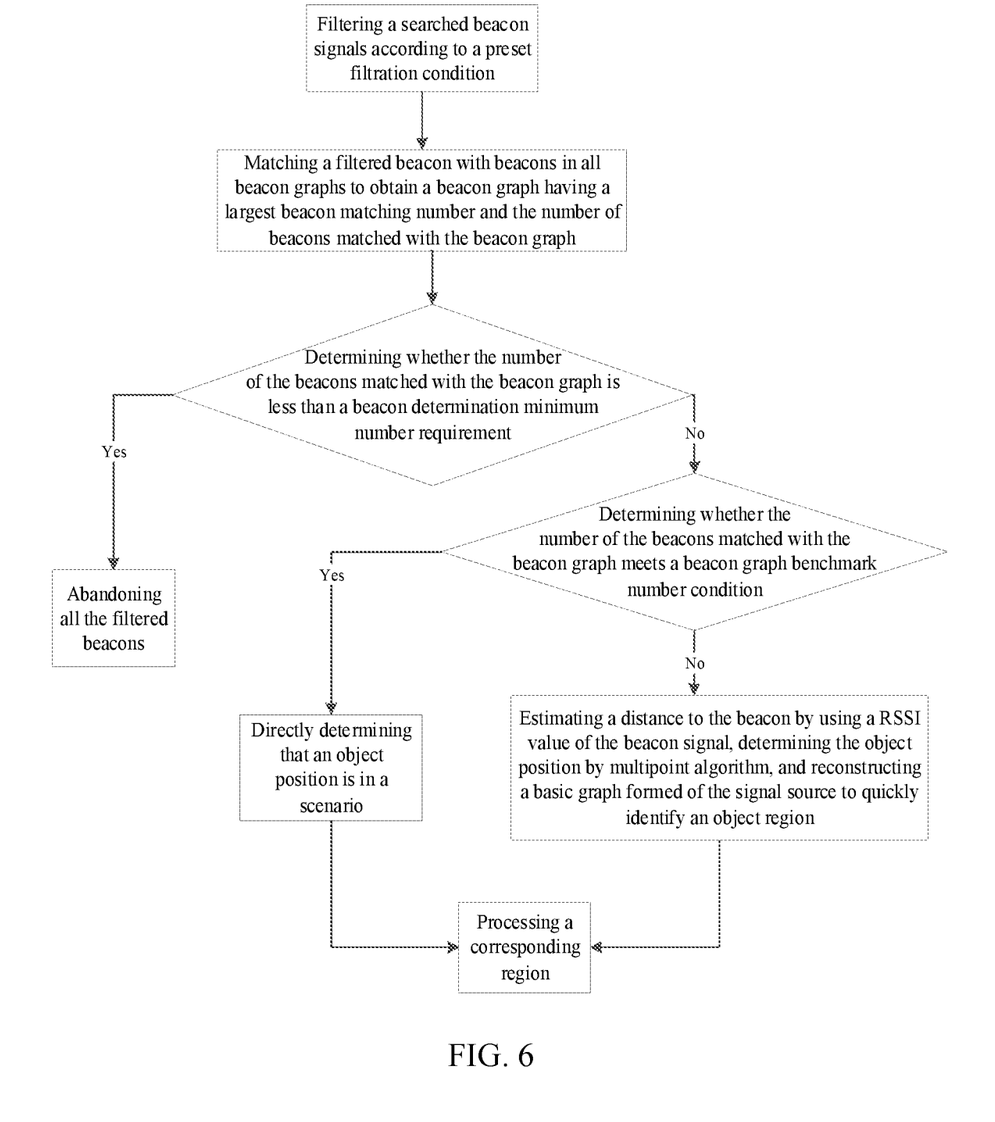
FIG. 6 is a schematic diagram of a graphical near-field identification method of a signal source according to an embodiment of the present disclosure.

As shown in FIG. 6, a device for realizing near-field identification in the present disclosure is a radio frequency receiving terminal, such as a mobile phone, a work card, etc. When the radio frequency receiving terminal starts, it searches for the radio frequency transmission packet and records statistics.

1) Searching all beacon radio frequency source signals searched at regular time interval (for example, 3 seconds) and analyzing the searched beacon signals. The searching and analyzing, for example, may be done by one or more processors.

The analysis content includes: UUID and major of this batch of signal source beacons (for example, UUID=FDA50693-A4E2-4FB1-AFCF-C6EB07647825, major=10106), and the RSSI values of these signal sources.

2) Filtering the beacon signals according to a preset filtration condition, and directly skipping those that do not meet the condition during recording statistics:

Filtration condition 1: effective RSSI threshold (for example, w>=−90 dbm), and the signals below the effective RSSI threshold are filtered out.

Filtration condition 2: the number of times that the effective RSSI of the same beacon is received, and the beacons below a effective number are filtered out;

A rough identification of signal source is completed, and the relevant parameters of the above steps are adjusted according to different environments, the environment factors include response speed, regional accuracy, mutual interference and so on.

3) Matching the filtered beacons with the beacons in all beacon graphs to obtain a beacon graph A having the largest beacon matching number and the number $Zi$ of beacons matched with the beacon graph A. For example, the matching may be done by a detector that detects when the matching occurs.

The radio frequency receiving terminal obtains a beacon graph database from the background before regularly searching the beacon radio frequency source signal, and the information related to the beacon graph comes from the beacon graph database. The beacon graph information includes the shape of the beacon graph, the serial number of each beacon in the beacon graph, and the coordinates of each beacon.

For example, four beacons are matched with the beacon graph A, two beacons are matched with the beacon graph B, and one beacon is matched with the beacon graph C, then the beacon graph that is successfully matched with the largest number of beacons is beacon graph A, and the number of beacons matched with the beacon graph A is four.

4) Determining whether the beacon number $Zi$ matched with the beacon graph A is less than a beacon determination minimum number requirement, and if yes, abandoning all the filtered beacons. For example, one or more processors can be configured to determine whether the beacon number $Zi$ matched with the beacon graph A is less than a beacon determination minimum number requirement.

For example, in the case where $Zi<=2$, it means that the terminal has not entered the scenario, or there is large interference at present, and the currently received beacon data is abandoned. Here, the beacon determination minimum number requirement is set to 2, which can also be adjusted according to the scenario, the total number of beacons in each graph and other factors.

5) If $Zi$ is not less than the beacon determination minimum number requirement, continuing to determine whether $Zi$ meets a beacon graph benchmark number condition, and if yes, directly determining that an object position is in the scenario where the beacon graph is located.

In the case where $Zi>=(Xi/2+1)$, it can be considered that the number of the beacons that are matched with the beacon graph meets the beacon graph benchmark number condition, and the object position can be directly determined to be in the scenario where the beacon graph is located, where $Xi$ is the total number of beacons in the beacon graph, and the minimum total number of beacons is set to 4. This judgment condition is not an absolute limiting condition, but can be set according to the number of the beacons deployed in the scenario, scenario interference and other factors.

6) If $2<Zi<(Xi/2+1)$, performing a graphical reconstruction identification.

The distance to the object is estimated through RSSI value of a standard signal source, and the position is calculated by multipoint algorithm, so as to reconstruct a basic graph formed of the signal sources and quickly identify the region.

Figure 7:
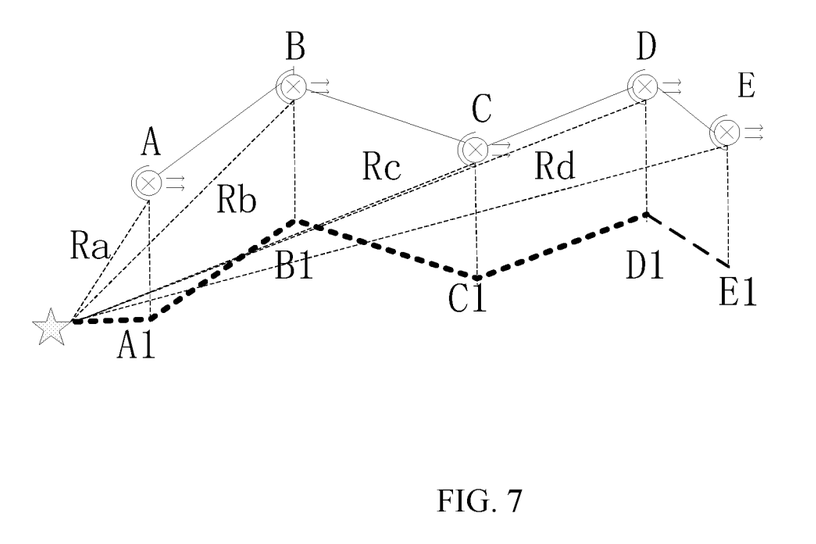
FIG. 7 shows an example of the calculation method of beacons with an irregular graph deployment according to an embodiment of the present disclosure.

Now take the irregular graph as an example, and the calculation method of the irregular graph is shown in FIG. 7.

Assume that the filtered beacons are beacon A, beacon B and beacon D. According to the RSSI values of beacons A, B and D, the distances from the terminal to beacons A, B and D are RA, RB and RD, respectively. The mapping points from beacons A, B and D to the plane where the terminal is located are A1, B1 and D1, respectively. The distance from the terminal to A1 is $RA1=\sqrt{RA^2-(h-1.5)^2}$, where h is the height from the beacon to the ground in the scenario and 1.5 is the ordinary height from the terminal to the ground. In the same way, the distance from the terminal to B1 is $RB1=\sqrt{RB^2-(h-1.5)^2}$, the distance from the terminal to D1 is $RD1=\sqrt{RD^2-(h-1.5)^2}$.

Because the coordinates of A1, B1 and D1 can be obtained according to the coordinates of A, B and D, the position of the terminal relative to A1, B1 and D1 can be determined. In addition, the coordinates of C1 and E1 can be obtained by performing graph reconstruction according to the coordinates of A1, B1 and D1, that is, the position of the terminal relative to the irregular graph can be obtained, thus identifying the region where the terminal is located.

The beacon in the present disclosure can be integrated into lighting devices in different forms, such as flat lights in office places, downlights and spotlights in shopping malls, outdoor courtyard lights in the community. The beacon can be completely hidden in appearance, and specially, the problems of the outdoor waterproofing and dustproofing are solved by the lighting devices themselves. The beacon can be powered by the incoming power line of the lighting device, thus solving the problem that the beacon cannot be supplied with power continuously in the prior art. Although the preferred embodiments of the present disclosure have been described, those skilled in the art can make additional changes and modifications to these embodiments once they know the basic inventive concepts. Therefore, the appended claims are intended to be interpreted as including the preferred embodiments and all changes and modifications falling within the scope of the present disclosure.

Further, before filtering the beacon signal, a beacon radio frequency source signal is regularly searched, and the searched beacon signal is analyzed.

Further, before regularly searching the beacon radio frequency source signal, a beacon graph database is obtained from a background, wherein the beacon graph database includes beacon graph information.

Further, the beacon graph information includes a shape of the beacon graph, a serial number of each beacon in the beacon graph, and coordinates of each beacon in a plane where the each beacon is located.

Further, the determining whether the largest beacon matching number meets the beacon graph benchmark number condition includes: determining whether the largest beacon matching number reaches an effective proportion of a total number of beacons in the beacon graph.

Further, the determining whether the largest beacon matching number reaches the effective proportion of the total number of beacons in the beacon graph includes: determining whether the largest beacon matching number reaches a half of the total number of beacons in the beacon graph.

Further, the apparatus further includes a searching module and an analysis module, wherein the searching module is configured to regularly search a beacon radio frequency source signal before filtering the beacon signal, and the analysis module is configured to analyze the searched beacon signal. For example, the searching and analysis modules may be one or more processors.

Further, the apparatus further includes an obtaining module, wherein the obtaining module, configured to obtain a beacon graph database from a background before regularly searching the beacon radio frequency source signal, and the beacon graph database includes beacon graph information. For example, one or more processors may obtain the beacon graph database from a background before regularly searching the beacon radio frequency source signal Further, the beacon signal information includes a shape of the beacon graph, a serial number of each beacon in the beacon graph, and coordinates of each beacon in a plane where the each beacon is located.

Further, the determining whether the largest beacon matching number meets the beacon graph benchmark number condition includes: determining whether the largest beacon matching number reaches a half of the total number of beacons in the beacon graph.

The beneficial effects of the present disclosure are as follows: the present disclosure reduces the influence caused by the identification of the unstable region of the signal source by graphical combination of beacons and the method of filtering and reconstructing the signal source, and reduces the impact of the difference by the matching detection mechanism between the radio frequency relative RSSI value and the initial graph. In general, various instabilities of the beacon itself and the environment can be processed by the graphical reconstruction method in the present disclosure, so that the regional object identification can be quickly and accurately completed.

When the technical solution is implemented in a specific environment after actual configuration, the relevant graph coordinate information has been implemented on the terminal, and there is no need for interaction with the background. The algorithms are localized, thereby accelerating the identification efficiency.

The present disclosure improves on poor accuracy, long identification time, random interference and the like in the current object identification process, and provides a graphical near-field identification method of a signal source.

Obviously, those skilled in the art can make various changes and modifications on the present disclosure without departing from the spirit and scope of the present disclosure. In this way, if these changes and modifications on the present disclosure fall within the scope of the claims of the present disclosure and equivalents thereof, the present disclosure is also intended to include these changes and modifications.

What is claimed is:

1. A graphical near-field identification method for a signal source, comprising:
   filtering a searched beacon signal according to a preset filtration condition;
   matching a filtered beacon with beacons in all beacon graphs to obtain a beacon graph having a largest beacon matching number and a number of beacons matched with the beacon graph;
   determining whether the number of the beacons matched with the beacon graph is less than a beacon determination minimum number requirement;
   abandoning all the filtered beacons in response to determining that the number of the beacons matched with the beacon graph is less than the beacon determination minimum number requirement;
   determining whether the number of the beacons matched with the beacon graph meets a beacon graph benchmark number condition in response to determining that the number of the beacons matched with the beacon graph is not less than the beacon determination minimum number requirement;
   determining that an object position is in a scenario where the beacon graph is located in response to determining that the number of beacons matched with the beacon graph meets the beacon graph benchmark number condition; and
   estimating a distance to the beacon by using a RSSI value of the beacon signal, determining the object position by multipoint algorithm, and reconstructing a basic graph formed of the signal source to quickly identify an object region, in the case where the number of beacons matched with the beacon graph does not meet the beacon graph benchmark number condition.

2. The graphical near-field identification method according to claim 1, further comprising:
   regularly searching, before filtering the beacon signal, a beacon radio frequency source signal, and
   analyzing the searched beacon signal.

3. The graphical near-field identification method according to claim 2, further comprising:
   obtaining, before the beacon radio frequency source signal is regularly searched, a beacon graph database from a background, wherein the beacon graph database comprises beacon graph information.

4. The graphical near-field identification method according to claim 3, wherein the beacon graph information comprises a shape of the beacon graph, a serial number of each beacon in the beacon graph, and coordinates of each beacon in a plane where the each beacon is located.

5. The graphical near-field identification method according to claim 1, wherein determining whether the largest beacon matching number meets the beacon graph benchmark number condition comprises:
   determining whether the largest beacon matching number reaches an effective proportion of a total number of beacons in the beacon graph.

6. The graphical near-field identification method according to claim 5, wherein determining whether the largest beacon matching number reaches the effective proportion of the total number of beacons in the beacon graph comprises:

determining whether the largest beacon matching number reaches a half of the total number of beacons in the beacon graph.

7. An apparatus for identifying a signal source, comprising:
a filter, configured to filter a beacon signal according to a preset filtration condition;
a detector, configured to detect when a filtered beacon matches with beacons in all beacon graphs to obtain a beacon graph having a largest beacon matching number and a number of beacons matched with the beacon graph; and
one or more processors, configured to determine whether the number of the beacons matched with the beacon graph is less than a beacon determination minimum number requirement, wherein all the filtered beacons are abandoned and the current search is abandoned in response to determining that the number of the beacons matched with the beacon graph is lower than the minimum number requirement, and configured to determine whether the number of the beacons matched with the beacon graph meets a beacon graph benchmark number condition in response to determining that the number of the beacons matched with the beacon graph is not less than the minimum number requirement,
wherein in response to determining that the number of beacons matched with the beacon graph meets the beacon graph benchmark number condition, an object position is determined to be in a scenario where the beacon graph is located, and
wherein in response to determining that the number of beacons matched with the beacon graph does not meet the beacon graph benchmark number condition, a distance to the beacon is estimated by using a RSSI value of the beacon signal, the object position is determined by multipoint algorithm, so that a basic graph formed of the signal source to quickly identify an object region is reconstructed.

8. The apparatus according to claim 7, wherein the one or more processors are further configured to:
regularly search a beacon radio frequency source signal before filtering the beacon signal, and
analyze the searched beacon signal.

9. The apparatus according to claim 8, wherein the one or more processors are further
configured to obtain a beacon graph database from a background before regularly searching the beacon radio frequency source signal, and wherein the beacon graph database comprises beacon graph information.

10. The apparatus according to claim 9, wherein the beacon signal information comprises a shape of the beacon graph, a serial number of each beacon in the beacon graph, and coordinates of each beacon in a plane where each beacon is located.

11. The apparatus according to claim 7, wherein determining whether the largest beacon matching number meets the beacon graph benchmark number condition comprises:
determining whether the largest beacon matching number reaches an effective proportion of a total number of beacons in the beacon graph.

12. The apparatus according to claim 11, wherein determining whether the largest beacon matching number reaches the effective proportion of the total number of beacons in the beacon graph comprises:
determining whether the largest beacon matching number reaches a half of the total number of beacons in the beacon graph.

* * * * *